United States Patent
Andrassy et al.

(10) Patent No.: US 11,853,051 B2
(45) Date of Patent: Dec. 26, 2023

(54) METHOD AND APPARATUS FOR OPTIMIZING DIAGNOSTICS OF ROTATING EQUIPMENT

(71) Applicant: Siemens Energy Global GmbH & Co. KG, Munich (DE)

(72) Inventors: Bernt Andrassy, Munich (DE); Mark Buckley, Munich (DE); Felix Buggenthin, Munich (DE); Giuseppe Fabio Ceschini, Florence (IT); Thomas Hubauer, Garching bei München (DE); Denis Krompaß, Munich (DE); Mikhail Roshchin, Munich (DE); Sigurd Spieckermann, Neukeferloh (DE); Michael Werner, Marloffstein (DE); Richard Arnatt, Lincoln (GB); Almir Avdovic, Norrkoping (SE); Zlatan Cota, Finspång (SE); Davood Naderi, Svärtinge (SE)

(73) Assignee: SIEMENS ENERGY GLOBAL GMBH & CO. KG

( * ) Notice: Subject to any disclaimer, the term of this patent is extended or adjusted under 35 U.S.C. 154(b) by 1255 days.

(21) Appl. No.: 16/086,016

(22) PCT Filed: Mar. 7, 2017

(86) PCT No.: PCT/EP2017/055331
§ 371 (c)(1),
(2) Date: Sep. 18, 2018

(87) PCT Pub. No.: WO2017/162434
PCT Pub. Date: Sep. 28, 2017

(65) Prior Publication Data
US 2019/0204820 A1    Jul. 4, 2019

(30) Foreign Application Priority Data
Mar. 22, 2016    (EP) .................................... 16161609

(51) Int. Cl.
*G05B 23/02* (2006.01)
*G06N 5/04* (2023.01)
(Continued)

(52) U.S. Cl.
CPC ....... *G05B 23/0281* (2013.01); *G05B 19/406* (2013.01); *G05B 23/0272* (2013.01);
(Continued)

(58) Field of Classification Search
CPC .............. G05B 23/0281; G05B 19/406; G05B 23/0272; G05B 23/0275; G06N 3/0427; G06N 5/022; G05N 3/08
(Continued)

(56) References Cited

U.S. PATENT DOCUMENTS 9,202,253 B2 *  12/2015  Macoviak .............. G16H 40/20
2005/0060323 A1 *  3/2005  Leung ................ G05B 23/0275
(Continued)

FOREIGN PATENT DOCUMENTS

| CN | 1514209 A | 8/2004 |
| CN | 101802928 A | 8/2010 |
| CN | 102840991 A | 12/2012 |

OTHER PUBLICATIONS

International Search Report for PCT/EP2017/055331.
(Continued)

*Primary Examiner* — Brian S Cook
(74) *Attorney, Agent, or Firm* — Schmeiser, Olsen & Watts LLP (57) ABSTRACT

A method and an apparatus for optimizing diagnostics of rotating equipment is provided. The apparatus includes a device for providing status information about status of the rotating equipment over a series of time windows whereby status can be derived from sensor features of at least one available sensor taking measurements during a predefinable
(Continued)

time period, a device for using deep learning which combines provided historic sensor information with sequence of events data indicating warnings and/or alerts of the rotating equipment, whereby status information is supplemented with via deep learning predicted probabilities whether a warning and/or an alert has occurred within a time window, device for providing an amount of textual diagnostic knowledge cases, device for extracting semantic information on text features from the textual diagnostic knowledge cases, and device for combining status information and semantic information into a unified representation enabling optimization of the diagnostics.

13 Claims, 4 Drawing Sheets

(51) Int. Cl.
*G06N 5/022* (2023.01)
*G06N 3/042* (2023.01)
*G06N 3/045* (2023.01)
*G06N 7/01* (2023.01)
*G05B 19/406* (2006.01)
*G06N 3/08* (2023.01)

(52) U.S. Cl.
CPC ......... *G05B 23/0275* (2013.01); *G06N 3/042* (2023.01); *G06N 3/045* (2023.01); *G06N 3/08* (2013.01); *G06N 5/022* (2013.01); *G06N 5/041* (2013.01); *G06N 7/01* (2023.01); *G05B 2219/33284* (2013.01)

(58) Field of Classification Search
USPC .......................................................... 706/12
See application file for complete search history.

(56) References Cited

U.S. PATENT DOCUMENTS

| | | |
|---|---|---|
| 2009/0019938 A1 | 1/2009 | Klosinski |
| 2011/0202800 A1 | 8/2011 | Mackey et al. |
| 2012/0316835 A1* | 12/2012 | Maeda ................ G06K 9/6252 |
| | | 702/183 |
| 2012/0330614 A1 | 12/2012 | Kar |

OTHER PUBLICATIONS

Written Opinion for PCT/EP2017/055331.
European Extended Search Report dated Sep. 21, 2016 for Application No. 16161609.9.

* cited by examiner

| | | | |
|---|---|---|---|
| BD000023U02 6104818 Gulf JP KP1 GT2 SGT-800A+ 299647 23.07.2015 11:26 | Finspong RDC Helpdesk Queue | Bleed Valve 2 - position fault | |
| BD000023U02 6104818 Gulf JP KP1 GT2 SGT-800A+ 297987 13.07.2015 10:58 | Finspong RDC Helpdesk Queue | Pressure Compressor Outlet-Transmitter Deviating | |
| BD000023U02 6104818 Gulf JP KP1 GT2 SGT-800A+ 301142 03.08.2015 15:30 | Finspong RDC Helpdesk Queue | Bleed Valve 1 - Position deviating | |

Similarity between case 301142 and:
1. 297987 (Similarity 0.44) - Bleed Valve 2...
2. 299647 (Similarity 0.24) - Pressure Compressor...

METHOD AND APPARATUS FOR OPTIMIZING DIAGNOSTICS OF ROTATING EQUIPMENT

CROSS-REFERENCE TO RELATED APPLICATIONS

This application claims priority to PCT Application No. PCT/EP2017/055331, having a filing date of Mar. 7, 2017, based on European Application No. 16161609.9, having a filing date of Mar. 22, 2016, the entire contents both of which are hereby incorporated by reference.

FIELD OF TECHNOLOGY

The following relates generally to a method and an apparatus for optimizing diagnostics of rotating equipment, in particular a gas turbine.

BACKGROUND

Remote monitoring and diagnostics of rotating equipment is indispensable in practice. Remote diagnostics of gas turbines is a complex task which can be divided into three steps: (1) Detection, (2) Isolation, and (3) Diagnosis. Recently, there has been an increased demand for a systematic approach to plant process safety, increased reliability and availability, lower maintenance cost, and continuous awareness about the equipment health status. This demand challenges the existing tool landscape which typically builds on an adoption of condition monitoring solutions and expert systems. Specifically, fault detection, fault isolation, failure mechanism definition and diagnosis definition as part of the systematic diagnostics are fundamental functionality to support engineers in their decision-making process, until the corrective action recommendation. However, due to the technical complexity caused by the large number of subsystems and process flows, diagnosis for industrial gas turbines is non-trivial, and requires multi-disciplinary expertise of various engineers from domains such as system mechanics, aerodynamics, and thermodynamics, to name only a few.

Only recently, the growth of computational power gave autonomous decision-making methods from the area of artificial intelligence a second wind, making available new methods and tools to tackle the challenges outlined before. One such example is Deep Learning, a powerful method that makes use of GPU hardware to build models with unseen capabilities to automatically construct relevant features from data.

During the analysis phase, the expert at the remote diagnostics center (RDC) normally enriches the sensor data available in the above-mentioned step (1) with his findings and hypotheses about failure modes and solutions, all of which are documented in a ticketing system (e.g. Salesforce or STM-RMS) as free text in natural language. While this unstructured (or semi-structured) way of documentation is convenient for the technician, it makes it very hard to share the knowledge expressed in these annotations with other colleagues. It is to propose solutions based on similar cases from the past. The challenge is therefore to provide a system which can automatically propose relevant historic cases to the technician during diagnosis, where both sensor data as well as (intermediary) human-generated content, mostly textual information, is taken into account. Furthermore, it is not practically feasible to have a solution that needs extensive manual tuning of parameters to perform well. Up to now, the diagnostic process in the remote diagnostic center (RDC) is largely manual and lacks support through software tools.

The above-mentioned ticketing system Salesforce has integrated functionality for the discovery of tickets that are similar to the one currently opened. It is very likely that standard measures such as TF/IDF over bag-of-words are used in this system. Term frequency-inverse document frequency (TF/IDF) is a numerical statistic that is intended to reflect how important a word is to a document. Moreover, no sensor data is included.

One further possible approach is case-based reasoning over spectral decompositions of sensor data to be used for identifying vibration situations. The underlying feature vector computation with respect to spectral decomposition is completely different approach than learning methods.

An aspect of classic case-based reasoning application is to manually define weights for similarity comparisons.

Firstly, such weights are typically not known and also not intuitive for experts to define. Secondly, the effort for collecting such "estimations" of similarity is considerable, taking into account that the experts need to define both "local" similarities between different manifestations as a feature, and a global combination function that combines the local similarities to a global value.

Common downsides of most of the previous mentioned potential working solutions that are not able to automatically predict relevant historic cases taking into account both sensor and textual information, nor can avoid extensive manual parameterization.

It is an advantage of embodiments of the present invention to provide an approach that integrates textual information into learning-based approaches to optimize gas turbines diagnostics.

SUMMARY

An aspect relates to one or more apparatus for optimizing diagnostics of rotating equipment.

An aspect of embodiments of the invention is (dynamic) integration textual information into learning-based approaches to optimize gas turbines diagnostics.

The inventive approach supports engineers in the Remote Diagnostic Centers. It is based on a combination of Natural Language Processing (NLP) technologies that allow us to build on the vast amount of diagnostic knowledge written down by the engineers with Deep Learning to include information about the actual turbine status derived from the available sensors. This approach is embedded into an overall systematic workflow building on physics-based, rule-based and data-driven methods. This framework supports the engineer in identifying relevant information, thereby reducing trouble shooting time significantly, increasing both Technical Responsiveness capability and capacity.

The proposed embodiment claims a method for optimizing rotating equipment diagnostics, in particular gas turbine diagnostics comprises the method steps of:
 a) Providing status information about status of the rotating equipment over a series of time windows whereby status is derived from sensor features of at least one available sensor taking measurements during a predefinable time period,
 b) Using deep learning which combines provided historic sensor information with sequence of events data indicating warnings and/or alerts of the rotating equipment, c) whereby status information is supplemented with via deep learning predicted probabilities whether a warning and/or an alert has occurred within a time window,
d) providing an amount of textual diagnostic knowledge cases,
e) extracting semantic information on text features from the textual diagnostic knowledge cases, and
f) combining status information and semantic information into a unified representation enabling optimization of the diagnostics.

Such optimized diagnostics lead to adjust operation of rotation equipment and/or to maintain the rotation equipment.

Deep learning can use a case-based reasoning learning method. A natural language training method can be used for extracting said semantic information. Different weights can be applied to different types of text features.

The result of this extraction is preferably a set of text feature vectors, one said vector for each textual diagnostic knowledge case. One text feature vector can be determined by classifying the case against trained cases resulting in different clusters brought about case similarity computation whereby the vector contains as many cluster membership degrees as clusters exist. Different types of text features can be affected parts and/or observed symptoms.

Deep learning can automatically identify latent structure that makes two said time windows similar or dissimilar in order to predict said probabilities.

Status information from the predefinable time period e.g. 24 hours with said probabilities are represented by a vector.

Predefinable may mean that a user can enter or select a time period or the time period is set by a default value e.g. 24 hours.

Said unified representation leads into one unified sensor and text feature vector.

A further aspect of embodiments of the invention is an apparatus for optimizing gas turbine diagnostics comprising:
a) means (11) or device for providing status information about status of the rotating equipment over a series of time windows whereby status can be derived from sensor features (10) of at least one available sensor taking measurements during a predefinable time period,
b) means (20) or device for using deep learning which combines provided historic sensor information with sequence of events data indicating warnings and/or alerts of the rotating equipment,
c) whereby status information is supplemented with via deep learning predicted probabilities whether a warning and/or an alert has occurred within a time window,
d) means (24) or device for providing an amount of textual diagnostic knowledge cases,
e) means (17) or device for extracting semantic information on text features from the textual diagnostic knowledge cases, and
f) means (19) or device for combining status information and semantic information into a unified representation enabling optimization of the diagnostics.

A further aspect of embodiments of the invention is a computer program (product) directly loadable into the internal memory of a computer, comprising software code portions for performing the steps of the above-mentioned method when said computer program (product) running on a computer or on one of the above-mentioned apparatus. The computer program product storing executable instructions comprising a computer readable hardware storage device (such as computer readable hardware storage device 51) having computer readable program code stored therein, said program code executable by a processor (such as processor 50) of a computer system adapted to perform the method Such a framework for context-aware analytics within flexible manufacturing systems, motivated by the need for accurate processing time estimates, is a benefit of this inventive approach. It can be successfully applied and commits less prediction errors compared to state-of-the-art adaptive learning models. More accurate estimates of processing times directly influence reliability of the manufacturing system's throughput times and cycle times, which are the basis for optimized production planning and scheduling.

BRIEF DESCRIPTION

Some of the embodiments will be described in detail, with references to the following Figures, wherein like designations denote like members, wherein.

DETAILED DESCRIPTION

Figure 1:
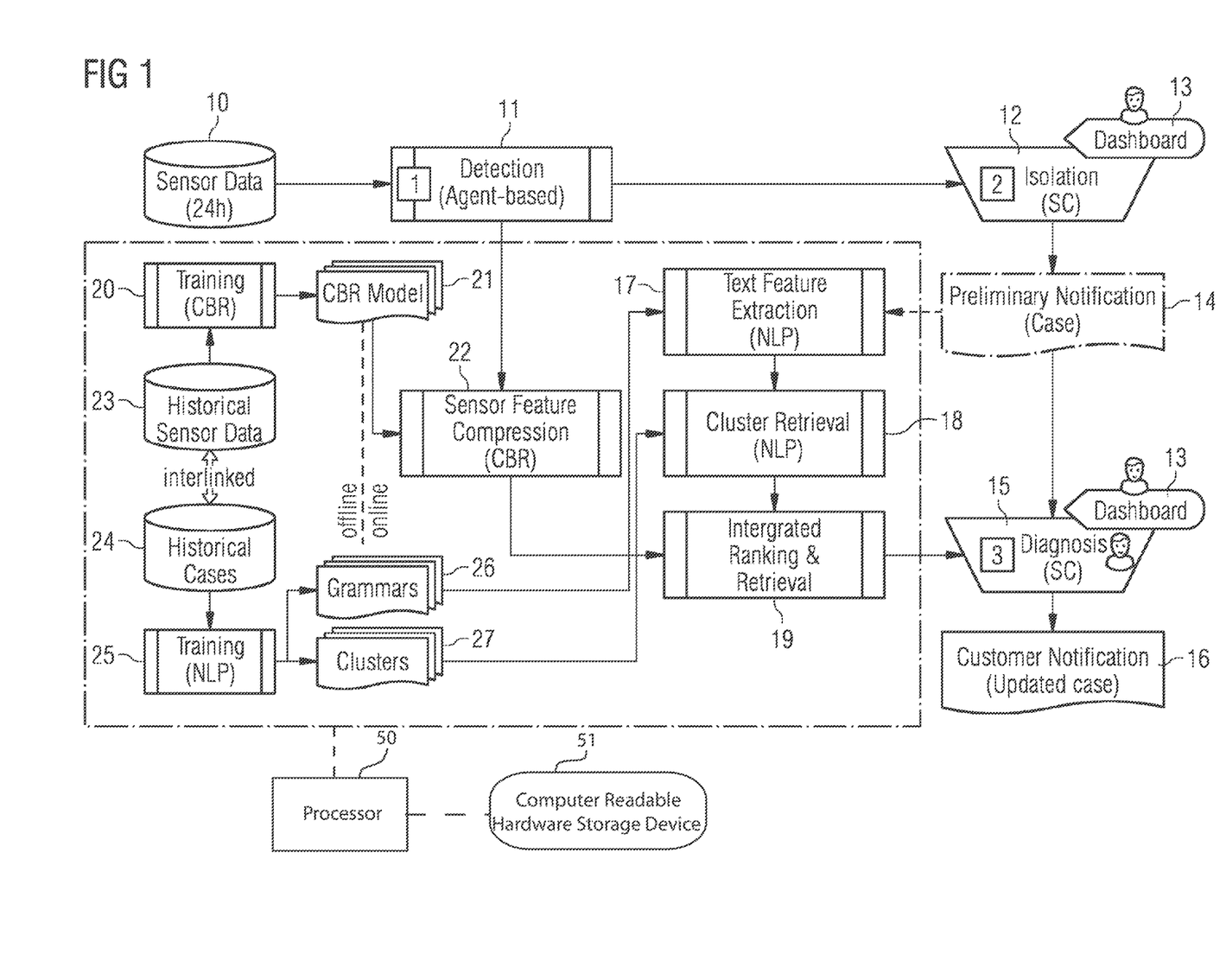
FIG. 1 schematically shows a concept using CBR and NLP based clustering and ranking.

FIG. 1 schematically shows a concept using CBR and NLP based clustering and ranking.

Marked with 1, 2 and 3 the FIG. 1 shows the previous mentioned steps (1) Detection 11, (2) Isolation 12, (3) Diagnosis 15 of sensor data 10 within one or several time windows (24 h window). In the step (2) and (3) a user may interact with the system via a dashboard 13 which executes said steps. Preliminary Notification 14 following after step (2) and Customer Notification 16 after step (3) could be useful as shown in FIG. 1.

The proposed approach uses both the sensor data 10 as well as the natural language annotations for automatically identifying similar cases from the past. The result of the similarity analysis and computation can be presented to the engineer/user in order to facilitate his/her search for a solution. An integration of the recommendation mechanism with standard tools and/or with a system already in use at the remote diagnostic centers (RDC) for gas turbines, such as Salesforce can be useful.

In a nutshell, historic data (both textual, that means historical cases 24 and historical sensor data 23, and interlinked via case ID and time information) are used. A training model can be used to
(a) compress a 24 h window of turbine sensor data into a compact latent feature vector (see "Sensor Feature Compression" 22), and
(b) to assign a new (preliminary) case in said tool/system to a set of pre-computed clusters based on the textual content (see "Text feature Extraction (NLP)" 17 and "Cluster Retrieval" 18, giving as result a vector of membership degrees for each of the clusters. So, Ranking of the membership and the cluster Retrieval is integrated and can be presented to the Diagnosis 15 step (3).

Both feature vectors are then combined and compared to the case base containing analogous representations for all historic cases, giving as a result list of relevant historic cases along with their degree of similarity, ordered by decreasing similarity. Said case similarities along with the cluster membership degrees of those related cases allow to compute straightforwardly which clusters are most relevant for a given case. The result is then displayed to the diagnostic engineer within the GUI, e.g. Display, of the diagnostic system. Analysis of text features for extracting (unstructured) text information can be implemented in a NLP (software) module 17. Sensor feature Compression 22 can be implemented in a CBR (software module). So a combination of the results of these two "uni-modal" modules into a "multi-modal" overall assessment is employed.

Figure 2:
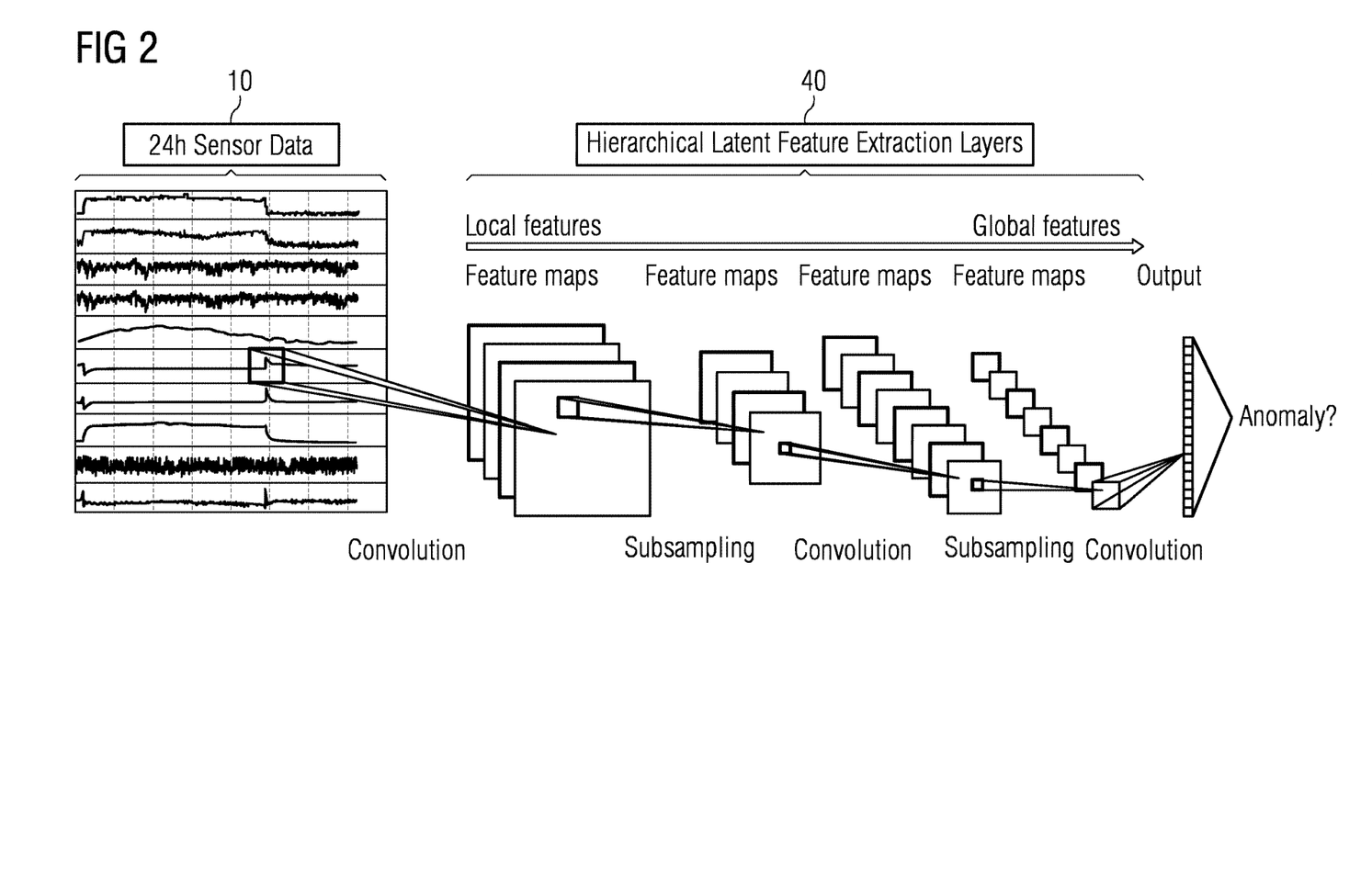
FIG. 2 schematically shows deep learning used for classifying time windows of events and extracting compact latent feature representations.

In the following these three modules in detail:

Case-Based Reasoning (CBR):

It is useful to apply machine learning methods (more concretely deep learning methods) to automatically identify the "hidden (latent) structure" that makes two (time) windows of sensor data similar or dissimilar. The historic data 23 can be used to train a so-called convolutional neural network 40 (CNN) based on an auxiliary task that combines the historic sensor information with sequence-of-events (SoE) data indicating warnings and alerts of the gas turbine. Deep learning is part of a broader family of machine learning methods based on learning representations of data. It may be based on a set of algorithms that attempt to model high-level abstractions in data by using multiple processing layers with complex structures, or otherwise composed of multiple non-linear transformations. CNN is usually a type of feed-forward artificial neural network where the individual neurons are tiled in such a way that they respond to overlapping regions in the receptive field.

Deep learning comprises the following steps:

Step I: Classification of time window, preferably 24 h windows,

Step II: Feature extraction

Step III: Similarity Computation

Step IV: Generalization which can be used for solving future problems of the same type.

As a first step I, a CNN is trained that takes all sensor measurements from a 24 h time window as inputs (the measurements can have a resolution of one minute, leading to 1440 values for each sensor). The auxiliary tasks consist of predicting the probability whether a warning or error has occurred in a prior given 24 h time window within the corresponding sensor data time series. After training (CBR) 20 is completed, the output node of the network is removed and the last hidden layer is used as new output layer. The new output of the CNN will then output a set of latent features extracted from the complete set of sensor data in the 24 h time window (Step II). The number of latent features extracted is configurable in the design phase of the CNN structure. The similarity computation (instead of discovery) (step III) of relevant features is done automatically by the CNN learning algorithm.

Finally, the CBR learning model 21 learns features to differentiate the time series where an event (warning or alarm) has occurred. By looking at FIG. 2 on the left-hand side there are 24 h Sensor data depict in curves. Shown on the right-hand side (see 40) local features are mapped to global features by shown steps of convolution, subsampling and their repetition as long as the output needs to be classified into normal event or abnormal event. In the Generalization step IV may be concluded more than one rotating equipment of the same type.

Natural Language Processing (NLP):

NLP can be used for processing human-generated content which is fed into the diagnosis process by the diagnostic engineer/user. It is possible to extend the standard bag-of-words approach to representing a document as a feature vector by linguistic approaches. Based on a (language specific) dictionary and grammar 26 extracted from the historic cases 24 by an NLP expert, also "semantic" information on affected parts and observed symptoms from the text are extracted. This allows the NLP module to abstract from concrete (syntactic) formulations and to focus on the meaning of the content.

Training 25 of the NLP models is a two-step process:

In the first step each document has its bag-of words and semantic features extracted as described above. Different weights can be applied to different types of features, for instance to set more importance to symptoms. Then TF-IDF scaling can be applied across all features. The result of this step is a set of document feature vectors, one for each document.

In the second step the document feature vectors are clustered using non-negative matrix factorization. This step has two outcomes:

1) an assignment of documents to clusters 27 and 2) a set of new latent feature vectors, one for each document.

The latent feature vector is characteristic for a single document in the context of the other documents and the clusters they belong to. Similar documents have similar latent feature vectors. Based on the availability of experts/users, the clustering can be refined in an iterative process by discussing it with a domain expert and translating his or her feedback into configuration parameters for the clustering algorithm, such as feature weights. The feature vector for a given case is then determined by classifying the case (fuzzily) against the trained clusters, resulting in a vector of cluster membership degrees having as many entries as clusters. This "detour" enables to integrate expert feedback on the "similarity" of textual information e.g. textual case descriptions in a very straightforward way.

Figure 3:
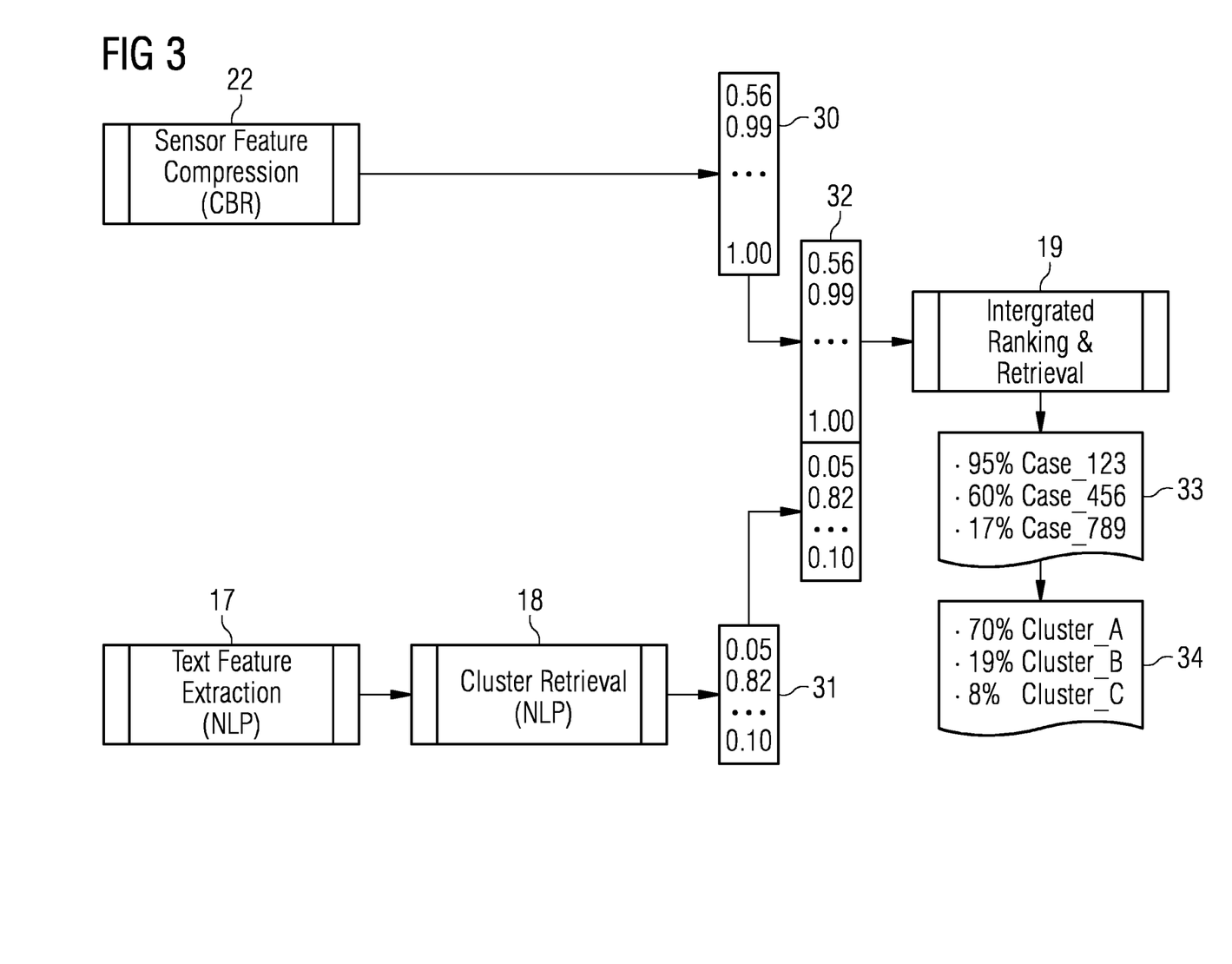
FIG. 3 depicts combining the feature vectors from CBR and NLP into one unified feature vector and FIG. 4 depicts an example of Similarity Computation.

Integrated Ranking and Retrieval 19:

As depict in FIG. 3 the proposed solution combines the feature vectors from CBR and NLP into one unified feature vector 32 which is in the end used for similarity computation. Unified representation more specifically the unified feature vector enables feedback to the optimization process in diagnostics. A possible implementation of similarity computation is to separately compute cosine distance in the CBR-portions 30 and on the NLP portions 31 of two cases, and combine these distances into a unified measure by taking the weighted mean of the two ones 30, 31. The benefit in using both CBR and NLP information for similarity calculation despite the fact that NLP-based information have already been taken into account for cluster formation is that similarities on case level 33 are usually more consistent with than similarities on clusters 34.

By computing distances within the NLP- and CBR-modules/components prior to only combining their results in a second step, it needs to be taken into account that the dimensionalities of these two vectors differ significantly.

FIG. 3 depicts for example these two vectors. This could otherwise lead to a bias towards the CBR-based assessment. The overall solution can be presented to the diagnostic engineer. Also, a technical implementation of the propose solution may include some UI-element (UI=User Interface) that allows the engineer to rate and/or weight the results provided by the method. This enables continuous evaluation of the approach as well as providing training data which can be used for further optimizing the used models.

Such optimized diagnostics can lead to adjust operation of rotation equipment and/or to maintain the rotation equipment.

Figure 4:
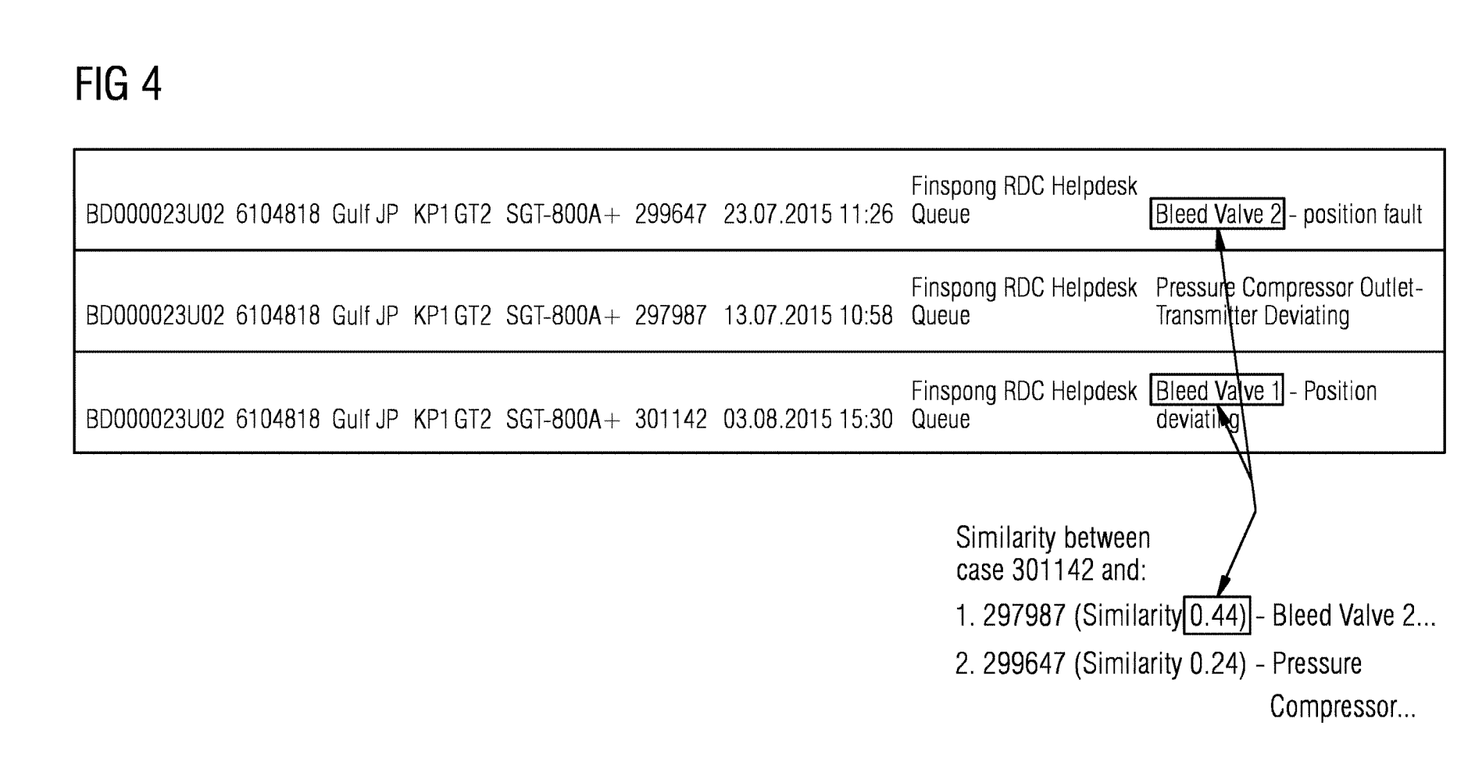

Referring to the above mentioned Step III FIG. 4 depicts a simplified example of Similarity Computation. In the rows on the top there are case numbers and textual findings. Similarity computation as previously described brings about similarity degrees. E.g. Similarity degree related to the text feature "Bleed Valve" between case with case number 301142 and case 297987 is 0.44 and the similarity degree related to text feature "Pressure compressor" between case 301142 and case 299647 is 0.24.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A method for optimizing diagnostics of rotating equipment, comprising:
    providing status information about a status of the rotating equipment over a series of time windows wherein the status is derived from sensor measurements of at least one available sensor taking measurements during a predefinable time period,
    identifying a given case of the rotating equipment and generating a sensor feature vector for the given case using deep learning which combines provided historic sensor information with sequence of events data indicating warnings and/or alerts of the rotating equipment, wherein deep learning uses a case-based reasoning learning method, wherein status information is supplemented with via deep learning predicted probabilities whether a warning and/or an alert has occurred within a time window of the series of time windows, and wherein said deep learning automatically identifies latent structure that makes two time windows of the series of time windows similar or dissimilar in order to predict the probabilities,
    providing an amount of historic textual diagnostic knowledge cases,
    extracting semantic information on text features from the historic textual diagnostic knowledge cases and from the given case, wherein a natural language training method is used for extracting said semantic information,
    determining a text feature vector for the given case, and
    combining the sensor feature vector for the given case and the text feature vector for the given case into a unified representation enabling optimization of the diagnostics, wherein the unified representation is one unified feature vector.

2. The method according to claim 1, wherein such optimized diagnostics lead to adjust operation of rotation equipment and/or to maintain the rotation equipment.

3. The method according to claim 1, wherein the result of this extraction is a set of text feature vectors, one said vector for each textual diagnostic knowledge case.

4. The method according to claim 3, wherein the text feature vector for the given case is determined by classifying the given case against trained cases resulting in different clusters brought about case similarity computation wherein the vector contains as many cluster membership degrees as clusters exist.

5. The method according to according to claim 1, wherein different weights are applied to different types of text features.

6. The method according to according to claim 1, wherein different types of text features are affected parts and/or observed symptoms.

7. An apparatus for optimizing diagnostics of rotating equipment, comprising at least one hardware processor, wherein the apparatus is configured for:
    providing status information about a status of the rotating equipment over a series of time windows wherein the status can be derived from sensor measurements of at least one available sensor taking measurements during a predefinable time period,
    identifying a given case of the rotating equipment and generating a sensor feature vector for the given case using deep learning which combines provided historic sensor information with sequence of events data indicating warnings and/or alerts of the rotating equipment, wherein deep learning uses a case-based reasoning learning method, wherein status information is supplemented with via deep learning predicted probabilities whether a warning and/or an alert has occurred within a time window of the series of time windows, and wherein the deep learning automatically identifies latent structure that makes two time windows of the series of time windows similar or dissimilar in order to predict said probabilities,
    providing an amount of historic textual diagnostic knowledge cases,
    extracting semantic information on text features from the historic textual diagnostic knowledge cases and from the given case, wherein a natural language training method is used for extracting said semantic information,
    determining a text feature vector for the given case, and
    combining the sensor feature vector for the given case and the text feature vector for the given case into a unified representation enabling optimization of the diagnostics, wherein the unified representation is one unified feature vector.

8. The apparatus according to claim 7, wherein such optimized diagnostics lead to adjust operation of rotation equipment and/or to maintain the rotation equipment.

9. The apparatus according to claim 3, wherein the result of this extraction is a set of text feature vectors, one said vector for each textual diagnostic knowledge case.

10. The apparatus according to claim 9, wherein the text feature vector for the given case can be determined by classifying the given case against trained cases resulting in different clusters brought about case similarity computation wherein the vector contains as many cluster membership degrees as clusters exist.

11. The apparatus according to claim 7, wherein different weights can be applied to different types of text features.

12. The apparatus according to claim 7, wherein different types of text features are affected parts and/or observed symptoms.

13. A computer program product, comprising a non-transitory computer readable hardware storage device having computer readable program code stored therein, said program code executable by a processor of a computer system to the method of claim 1.

\* \* \* \* \*